(12) United States Patent
Chang et al.

(10) Patent No.: US 11,266,965 B1
(45) Date of Patent: Mar. 8, 2022

(54) ULTRA-LOW-SPEED ROTATING LOW-STRAIN HIGH-FILLING-RATE HYDROGEN STORAGE ALLOY REACTION DEVICE AND TECHNOLOGY

(71) Applicants: SHANDONG UNIVERSITY, Qingdao (CN); Qingdao Xiangtai Material & Energy Technology Co,. Ltd., Qingdao (CN)

(72) Inventors: Jingcai Chang, Qingdao (CN); Chunyuan Ma, Jinan (CN); Zezheng Dong, Qingdao (CN); Zhen Meng, Qingdao (CN); Haoran Wu, Qingdao (CN); Yifan Li, Qingdao (CN); Yue Sun, Qingdao (CN)

( * ) Notice: Subject to any disclaimer, the term of this patent is extended or adjusted under 35 U.S.C. 154(b) by 0 days.

(21) Appl. No.: 17/148,772

(22) Filed: Jan. 14, 2021

(51) Int. Cl.
*B01J 8/10* (2006.01)
*C01B 3/00* (2006.01)
*B01J 8/08* (2006.01)

(52) U.S. Cl.
CPC ............... *B01J 8/10* (2013.01); *B01J 8/082* (2013.01); *B01J 8/085* (2013.01); *B01J 8/087* (2013.01); *C01B 3/0042* (2013.01); *B01J 2208/00477* (2013.01); *B01J 2208/00513* (2013.01)

(58) Field of Classification Search
CPC ..... B01J 8/10; B01J 8/082; B01J 8/085; B01J 8/087; B01J 2208/00513; B01J 2208/00522; C01B 3/0005; C01B 3/0042; C01B 3/0031; C01B 3/0084
See application file for complete search history.

(56) References Cited

U.S. PATENT DOCUMENTS 6,461,766 B1 10/2002 Young
2003/0175590 A1 9/2003 Nakamura
2003/0205300 A1 11/2003 Nakamura

FOREIGN PATENT DOCUMENTS

CN 1419957 A 5/2003
CN 1419959 A 5/2003

*Primary Examiner* — Lessanework Seifu (57) ABSTRACT

An ultra-low-speed rotating low-strain high-filling-rate hydrogen alloy automatic absorption-desorption reaction device includes a shell, a hydrogen storage reaction bed, a motor, a controlling and monitoring system, a wire inlet port, a hydrogen absorption and desorption port, and a universal angle wheel. The reaction bed is circular, rotating at a low speed under driving of a light ultra-low speed motor; facades on two sides of the reaction bed are respectively provided with a transmission shaft and the hydrogen absorption and discharge port which are respectively connected with an ultra-low-speed gear reduction motor or a high-pressure hydrogen storage tank and a hydrogen-consuming device; the reaction bed includes a hydrogen storage metal alloy, a heat-conducting anti-hardening filling material, and a phase change material; a shell of the alloy reaction bed has a heater and an external side surface of a hydrogen storage alloy reaction device has a PLC controlling and monitoring system.

8 Claims, 10 Drawing Sheets

ULTRA-LOW-SPEED ROTATING LOW-STRAIN HIGH-FILLING-RATE HYDROGEN STORAGE ALLOY REACTION DEVICE AND TECHNOLOGY

CROSS REFERENCES TO RELATED APPLICATIONS

The present application claims foreign priority of Chinese Patent Application No. 202011237195.3, filed on Nov. 9, 2020 in the State Intellectual Property Office of China, the disclosures of all of which are hereby incorporated by reference.

TECHNICAL FIELD

The disclosure belongs to the field of hydrogen storage alloy application research, and more particularly, relates to an ultra-low-speed rotating low-strain high-filling-rate hydrogen storage alloy reaction device and technology.

BACKGROUND

Hydrogen energy is valued by human beings due to a superior performance thereof. A hydrogen storage density per unit volume of a hydrogen storage alloy is much higher than that of a high-pressure bottle manner, and is also higher than that of liquid hydrogen, with mild hydrogen storage conditions, and hydrogen absorption and desorption are accompanied by an obvious heat effect, so that the hydrogen storage alloy has a great application potential in the field of energy conversion and utilization. With advantages of nickel and rare earth resources in China, the hydrogen storage alloy has a broad industrial application prospect. However, at present, the application of the hydrogen storage alloy is relatively mature in the field of batteries only, and other application fields still need to be developed. After hydrogen absorption of the hydrogen storage alloy, a volume of the hydrogen storage alloy will expand obviously (15% vol % to 20% vol %), and periodic expansion and contraction of a lattice enable the alloy to bear a stress to induce an internal crack. With residual internal crack and heat stress during manufacturing, after several circulations of hydrogen absorption and desorption, the alloy starts to be pulverized into powder of several microns to tens of microns, and hydrogen absorption pulverization becomes an inherent characteristic of the hydrogen storage alloy. A performance of a hydrogen storage alloy reaction device directly depends on a design level of a reaction bed thereof, and alloy pulverization is a main bottleneck of a reaction bed design, with great hazards as follows: ① a powder alloy is easy to be hardened and has a poor fluidity, so that bed body expansion, plastic deformation, and failure are easily caused; ② a heat conductivity of the powder alloy can be reduced by an order of magnitude compared with that of original particles, which hinders heat flow transfer during hydrogen absorption and desorption, thus reducing a hydrogen absorption and desorption speed; ③ the alloy pulverization may take the chance to increase a gas resistance of the bed body, and inhibit mass transfer of the hydrogen absorption and desorption of the alloy in the bed body; and ④ blocking of a gas release needle valve is easily caused, which brings a great hidden danger to a system safety.

In view of this, improvement of heat and mass transfer performances of the reaction bed on the premise of ensuring a structural strength of the bed body becomes a most critical link in the application research of the hydrogen storage alloy. At present, the disclosure aiming at a hydrogen storage alloy reaction bed device mainly focuses on the following two aspects. ① Dedication to development of standard unit hydrogen storage tank for relieving local stress concentration: CN1752506A provides a circular hydrogen storage tank having a simple structure and no embedded gas pipe suitable for small-scale hydrogen storage, which is internally provided with an aluminum wire mesh to enhance heat transfer; CN104100834A, CN202048351U, and CN106813101A respectively provide a circular hydrogen storage tank made of a porous metal particle, high-heat-conductivity plating honeycomb foam aluminum, foam nickel, and a hydrogen storage alloy in a mixed manner; CN105371105A provides a circular hydrogen storage tank internally provided with a spiral stainless steel coil and an elastic buffer layer of a foam nickel layer; CN105387341A, CN107859871A, and CN108131563A respectively provide a circular hydrogen storage tank with 10 layers of gas guide isolation plates, multiple layers of fine-diameter isolation meshes, and a pure aluminum spiral; CN105715953A provides a portable small hydrogen storage container with a shell made of a multilayer composite material, which realizes heat exchange between an inside and an outside of the hydrogen storage container by utilizing a metal foil connected to the outside of the hydrogen storage container and placed at an innermost layer of the shell; and CN107270120A provides a vehicle-mounted light high-pressure composite (high-pressure gas plus metal combination) circular hydrogen storage tank to increase a volume density of hydrogen storage. ② Dedication to rapid hydrogen absorption and desorption hydrogen storage reaction bed system for enhancing heat transfer: CN200310101758.6 provides a reaction bed composed of a hydrogen storage tank internally provided with a heat-conducting agent and an anti-hardening agent, and tank bodies are connected by a gold fin for enhancing heat transfer; CN106594518A provides a reaction bed, in addition to connecting the tank bodies by the fin for enhancing heat transfer, the fins are staggered to form a circulating water channel to enhance heat transfer; CN205480185U provides a reaction bed with an internal heat transfer structure composed of a circulating water pipeline and a fine-diameter copper mesh jointly; CN103185196A provides a modular metal hydride hydrogen storage reaction bed structure capable of being thermally matched with a fuel cell, which reduces dependence of hydrogen desorption of a hydrogen storage system on an ambient temperature; CN102865453A provides a metal hydride hydrogen storage reaction bed with a function of automatic hydrogen absorption and desorption, wherein an independent refrigeration tube filled with water, methanol, or ethane and an independent heating tube filled with freon or ammonia respectively release hydrogen storage heat to the environment and absorb environmental heat for hydrogen desorption; CN105202365A provides a reaction bed for automatic circulating hydrogen absorption and desorption between two metal hydride hydrogen storage tanks, which alternately immerses two communicated metal hydride hydrogen storage tanks into a high-temperature water bath and a low-temperature water bath to realize hydrogen desorption of the metal hydride hydrogen storage tank with a rising temperature and hydrogen absorption of the metal hydride hydrogen storage tank with a decreasing temperature; CN203248985U provides a reaction bed structure with tank bodies connected through a metal supporting plate and a copper fin radiator; and CN102942159A provides a composite hydrogen storage system reaction bed combining solid hydrogen storage and high-pressure gas hydrogen storage, which realizes heat exchange inside the device. In conclusion, on one hand, after the hydrogen absorption pulverization of the hydrogen storage alloy, physical and chemical properties of the hydrogen storage alloy are changed greatly, which not only directly lead to decrease of a self-heat/mass transfer performance, but also reduce a reliability of a whole reaction bed, and it is a common technical means for a hydrogen storage unit to internally install some components for enhancing heat transfer and resisting hardening; and on the other hand, most hydrogen storage alloy reaction beds are placed longitudinally or transversely, and the reaction beds or unit hydrogen storage tanks are mostly circular, with obvious advantages compared with other reaction beds or unit hydrogen storage tanks, such as those in a square, in terms of a stress tolerance.

However, during hydrogen absorption and desorption circulation of the alloy, a circular tank body generally has axial and circumferential strain problems. Circumferential buckling deformation and axial deformation of the transversely placed unit hydrogen storage tank are mainly concentrated in a range of ¼ pipe length of a lower part of the tank body, and the transversely placed unit hydrogen storage tank mostly appears at a lower part of a tail end of the hydrogen storage tank, and then extends to a middle and lower part of the tank. A root of stress accumulation lies in a settlement effect of pulverized particles, so that a local filling rate of the tank body is increased obviously from top to bottom, and a filling rate of a bottom is larger, with a most prominent stress accumulation phenomenon. In addition, expansion and contraction of the alloy are also affected by a "circulating compression effect" dominated by a friction between a bed wall and the alloy, so that the local filling rate of the alloy is gradually increased from a hydrogen port to the tail end, resulting in plastic deformation and failure after a local filling density at the bottom of the tank body exceeds an allowable value. In order to ensure a reliability of a bed body, increasing a strength of the bed body, sacrificing a hydrogen storage density of a system, and strictly controlling a filling amount and working conditions of the hydrogen storage alloy are common technical means in design of the hydrogen storage alloy reaction bed. However, the above means not only have a high cost and a poor economy, but also bring negative effects on a self-weight, heat transfer, the hydrogen storage density, and the like, and cannot ensure the reliability of the bed body, so that the technical means must be combined with new measures for relieving the stress of the bed body.

SUMMARY

In view of this, the disclosure aims at obviously relieving stress concentration of a bed body, obviously increasing a filling rate of an alloy and a hydrogen storage density of a system, and effectively improving a reliability of the bed body, and provides an ultra-low-speed rotating low-strain high-filling-rate hydrogen storage alloy reaction device and technology. A hydrogen storage reaction bed in the device is in an ultra-low-speed rotating state, a gravity effect is introduced, and a contact wall surface and the alloy have a periodic circulation of "close contact" (the bed body is located below the alloy) and "separation" (the bed body is located above the alloy), so that circulating compression and a natural settlement effect generated during hydrogen absorption and desorption of a static alloy reaction bed are weakened in principle, so that a risk of one-way settlement and accumulation of a pulverized alloy is effectively prevented, the pulverized alloy is finally distributed in the reaction bed, a filling density of metal particles in the reaction bed is uniform, and a hardening condition of metal powder is significantly reduced, thus greatly relieving plastic deformation and failure caused by an excessive local stress of the bed body, prolonging a service life of the reaction bed, and increasing the filling rate of the alloy and the hydrogen storage density of the system at the same time.

The disclosure is implemented by the following manners.

An ultra-low-speed rotating low-strain high-filling-rate hydrogen alloy automatic absorption-desorption reaction device includes a shell, a hydrogen storage reaction bed, a motor, a controlling and monitoring system, a wire inlet port, a hydrogen absorption and desorption port, and a universal angle wheel. The hydrogen storage reaction bed is a circular rotary type, and rotates at a low speed under driving of a light ultra-low speed motor; facades on two sides of the reaction bed are respectively provided with a transmission shaft and the hydrogen absorption and discharge port, which are respectively connected with an ultra-low-speed gear reduction motor or a high-pressure hydrogen storage tank and a hydrogen-consuming device; the hydrogen storage reaction bed includes a hydrogen storage metal alloy, a heat-conducting anti-hardening filling material, and a phase change material; a shell of the hydrogen storage alloy reaction bed is provided with a heater working at a temperature ranging from −20° C. to 400° C., and subjected to thermal insulation treatment; and an external side surface of a hydrogen storage alloy reaction device is provided with a PLC controlling and monitoring system.

Further, the hydrogen storage reaction bed is the circular rotary type, a joint between a circumference and side surface, and a joint between the side surface and the transmission shaft are transited by a large-angle arc, and the hydrogen storage reaction bed rotates at a low speed of 0.3 r/min to 3.0 r/min under driving of the light ultra-low speed motor.

Further, the hydrogen storage reaction bed is capable of being assembled by a plurality of standard unit hydrogen storage tanks, or is also capable of having a structure integrally filled with the hydrogen storage alloy; the hydrogen storage alloy in the hydrogen storage tank or the integrally filled hydrogen storage alloy is a high-temperature magnesium $A_2B$ type, with a hydrogen absorption pressure of 1.5 MPa at 344° C., a hydrogen desorption pressure of 0.2 MPa at 270° C., a theoretical hydrogen storage density of 3.6 wt %, and a heat conductivity of 1 $Wm^{-1}K^{-1}$ to 3 $Wm^{-1}K^{-1}$; the heat-conducting filling material in the hydrogen storage tank or the integrally filled heat-conducting filling material is a foam-like nickel or aluminum opening material, with a porosity of 50% to 80%, a density of 0.2 $g/cm^3$ to 0.5 $g/cm^3$, and a heat conductivity of 8 $Wm^{-1}K^{-1}$ to 12 $Wm^{-1}K^{-1}$; and the phase change material in the hydrogen storage tank or the integrally filled phase change material is a $NaNO_3$ particle with a similar copper or silver-plated surface, which may be cylinder-like, with an equivalent diameter of 3 mm to 5 mm, a density of 2.2 $g/cm^3$ to 2.4 $g/cm^3$, a heating conductivity of 0.4 $Wm^{-1}K^{-1}$ to 0.6 $Wm^{-1}K^{-1}$, a liquidus temperature of 307° C., and a solidus temperature of 306° C.

Further, an external side surface of a hydrogen storage alloy reaction device is provided with a small PLC controlling and monitoring system, which monitors main parameters such as a hydrogen storage pressure, a temperature, a stress of a bed body, a hydrogen flow rate, a rotating speed, and the like in real time, and has functions of automatic recording of historical data, automatic analysis of anomalies, audible and visual alarm, interlocking start and stop, and the like.

Further, during rotating, a lower part of the hydrogen storage reaction bed is supported by 1 to 3 sets of supporting wheels to support the reaction bed, so that a stress and a running resistance of the transmission shaft are reduced, and a low resistance and stable running of the reaction bed are ensured.

Further, a shell of the hydrogen storage alloy reaction bed is provided with a heater working at a temperature ranging from −20° C. to 400° C., and subjected to thermal insulation treatment.

Further, an ultra-low-speed rotating low-strain high-filling-rate hydrogen storage alloy reaction device may be moved integrally or fixed.

An ultra-low-speed rotating low-strain high-filling-rate automatic hydrogen absorption-desorption alloy reaction technology is provided.

1. A hydrogen storage reaction bed is circular, with a height-diameter ratio of about 0.2 to 0.5, and rotates at a low speed of 0.3 r/min to 3.0 r/min during hydrogen absorption and desorption, a gravity effect is introduced, and a contact wall surface and the alloy have a periodic circulation of "close contact" (a bed body is located below the alloy) and "separation" (the bed body is located above the alloy), so that circulating compression and a natural settlement effect generated during hydrogen absorption and desorption of a static alloy reaction bed are weakened in principle. The alloy moves in a rotating state at a low speed, which effectively relieves a circulating compression effect caused by expansion of a hydrogen absorption and desorption lattice of the alloy, an uneven loading degree, and a tail end settlement effect of pulverized particles commonly existing in the static reaction bed, and is a new, simple, effective, and reliable method for relieving the stress of the bed body, thus greatly improving a reliability of the bed body and keeping a hydrogen absorption and desorption performance of the bed body.

A hydrogen absorption lattice of a Mg—Ni binary alloy has a volume expansion rate of 15% to 20%, and the static reaction bed may have a circulating compression effect within a circulation time of hydrogen absorption and desorption of 600 s, which means that a filling density of an alloy phase at a closed end (far away from a hydrogen outlet side) is increased by about 0.5% in proportion compared with that at an opening end (hydrogen outlet side). Meanwhile, the alloy powder is crushed into micron-sized powder and settles naturally from an upper part, resulting in increase of a local density of a lower part of the reaction bed or the hydrogen storage tank, in the case of hydrogen absorption expansion again, a compressive stress and a cohesion borne by the powder are increased sharply, and the alloy is easy to be hardened and subjected to stress accumulation, easily resulting in plastic deformation and failure firstly occurring at a lower surface of the transversely placed static reaction bed or hydrogen storage tank and a lower part of the longitudinally placed reaction bed or hydrogen storage tank. However, for the alloy in a low-speed rotating state, a self-gravity of the alloy may offset an expansion stress among some alloy particles and a friction of the contact wall surface, so that the circulating compression and the natural settlement effect generated during hydrogen absorption and desorption of the static alloy reaction bed are weakened in principle, and compared with a traditional technical means for relieving the stress of the bed body (including increasing the strength of the bed body, sacrificing the hydrogen storage density of the system, strictly controlling the filling amount and the working conditions of the hydrogen storage alloy, and the like), the method has obvious advantages.

2. A safe filling rate of the hydrogen storage reactor bed (a ratio of a volume of the alloy to an effective volume of the reaction bed) is capable of reaching 35% to 50%, which is more than doubled compared with a safe filling rate of the longitudinally placed reaction bed (up to 20%) and is about 50% higher than that of the transversely placed reaction bed (up to 35%), a hydrogen storage density of a reaction bed system and a cost performance of the device are significantly improved, and a local filling density is uniform and stable during hydrogen absorption and desorption of the alloy, so that a safety and a reliability of the system are significantly improved.

A stress condition of a conventional static metal hydride reaction bed is special, and an expansion stress of the alloy at a lower bottom of the bed body is increasing due to accumulation of the pulverized alloy. For a conventional bed body, the filling amount and the working conditions of the bed body are generally strictly controlled while improving the structural strength and relieving the stress. The safe filling rate of the longitudinally placed reaction bed is generally controlled to be up to 20%, and the safe filling rate of the transversely placed reaction bed is generally controlled to be up to 35%. In a design of the reaction bed of the disclosure, a stress relief state inside the bed body is greatly improved, and the safe filling rate may reach 35% to 50%. Moreover, since the alloy is in the rotating state, a local filling density uniformity of the alloy in the reaction bed is stable, so that the safe filling rate can be greatly increased, and the hydrogen storage density of the system and the cost performance of the reaction bed device are obviously improved.

3. A circulation mode of phase change storage plus heat-conducting agent transfer is employed for a heat flow during hydrogen absorption and desorption of the hydrogen storage reaction bed. The heat flow generated during hydrogen absorption and desorption of a hydrogen storage metal is absorbed by the $NaNO_3$ particle with the similar copper or silver-plated surface, an amount of a phase change material is calculated with a theoretical heat flow load of the hydrogen storage metal, the heat-conducting foam-like nickel or aluminum opening material has a filling rate ranging from 15% to 40%, no additional heat-conducting system device is provided, and the system is simple and has a high reliability.

The shell of the hydrogen storage reaction bed is an electric thermal-insulation pressure-resistant composite shell, and may provide a working environment at a constant temperature ranging from −20° C. to 400° C. The heat flow (heat absorption or heat release) generated during the hydrogen absorption and desorption of the metal is stored by the cylindrical coating phase change material, and a hydrogen storage capacity of the alloy is controlled to be about 90% of a theoretical value, so that a heat transfer speed of the heat flow of the bed body is increased by 15% to 50%, a circulation time of the hydrogen absorption and desorption is reduced by 30% to 60% by adding the heat-conducting agent and the phase change material, and a response speed of mass and heat transfer of the hydrogen absorption and desorption of the metal is significantly improved.

The disclosure has the beneficial effects as follows.

According to the ultra-low-speed rotating low-strain high-filling-rate hydrogen storage alloy reaction device and technology of the disclosure, the ultra-low-speed rotation of the hydrogen storage alloy reaction bed internally installed in the device induces the alloy to generate a small-scale non-directional movement effect under an action of a microgravity. On one hand, unidirectional settlement and accumulation of the pulverized alloy may be effectively prevented, a risk of sharp increase of the local compressive stress and the cohesion at the lower part of the bed body or the tank is reduced, the pulverized alloy is distributed in the reaction bed, a deviation of the local filling density of the alloy is significantly reduced, and the settlement and accumulation effect of the alloy is obviously improved; and on the other hand, a part of friction generated by the wall surface of the bed body during recovery of expansion and retraction of the alloy may be offset, and meanwhile, the contact wall surface and the alloy have the periodic circulation of "close contact" (the bed body is located below the alloy) and "separation" (the bed body is located above the alloy), the friction is changed periodically, and the circulating compression effect of the alloy is weakened significantly. Finally, the filling density of the metal particles in the reaction bed is more uniform, a hardening symptom of the pulverized alloy is obviously improved, the plastic deformation and failure caused by the excessive local stress of the bed body is greatly relieved, and the filling rate of the alloy and the hydrogen storage density of the system are increased while prolonging the service life of the reaction bed.

In the drawing: 1 refers to thermal insulation pressure-resistant shell, 2 refers to ultra-low-speed motor, 3 refers to coupler, 4 refers to hydrogen storage reaction bed, 5 refers to PLC control display unit, 6 refers to spot start-stop button, 7 refers to rotating joint with gas sealing structure, 8 refers to hydrogen absorption and desorption pipeline, 9 refers to upper self-locking quick-opening buckle, 10 refers to lower self-locking quick-opening buckle, 11 refers to motor fixing bracket, 12 refers to plastic supporting roller, 13 refers to universal wheel, 14 refers to power supply connector, 15 refers to standard unit hydrogen tank, 16 refers to heat-conducting agent, 17 refers to coating phase change material, 18 refers to hydrogen tank filter sealing gasket, 19 refers to three-way pipe joint, 20 refers to connecting branch pipe, 21 refers to two-way joint, 22 refers to gas-guide tube, 23 refers to main hydrogen pipe, 24 refers to electric heating shell of hydrogen storage reaction bed, 25 refers to longitudinally placed static hydrogen storage reaction bed, 26 refers to original particle of hydrogen storage alloy, 27 refers to fine particle of pulverized alloy, 28 refers to micro-fine particle of pulverized alloy, and 29 refers to transversely placed static hydrogen storage reaction bed.

DETAILED DESCRIPTION

Multiple optimal embodiments of the disclosure are given hereinafter with reference to FIG. 1 to FIG. 10.

Figure 1:
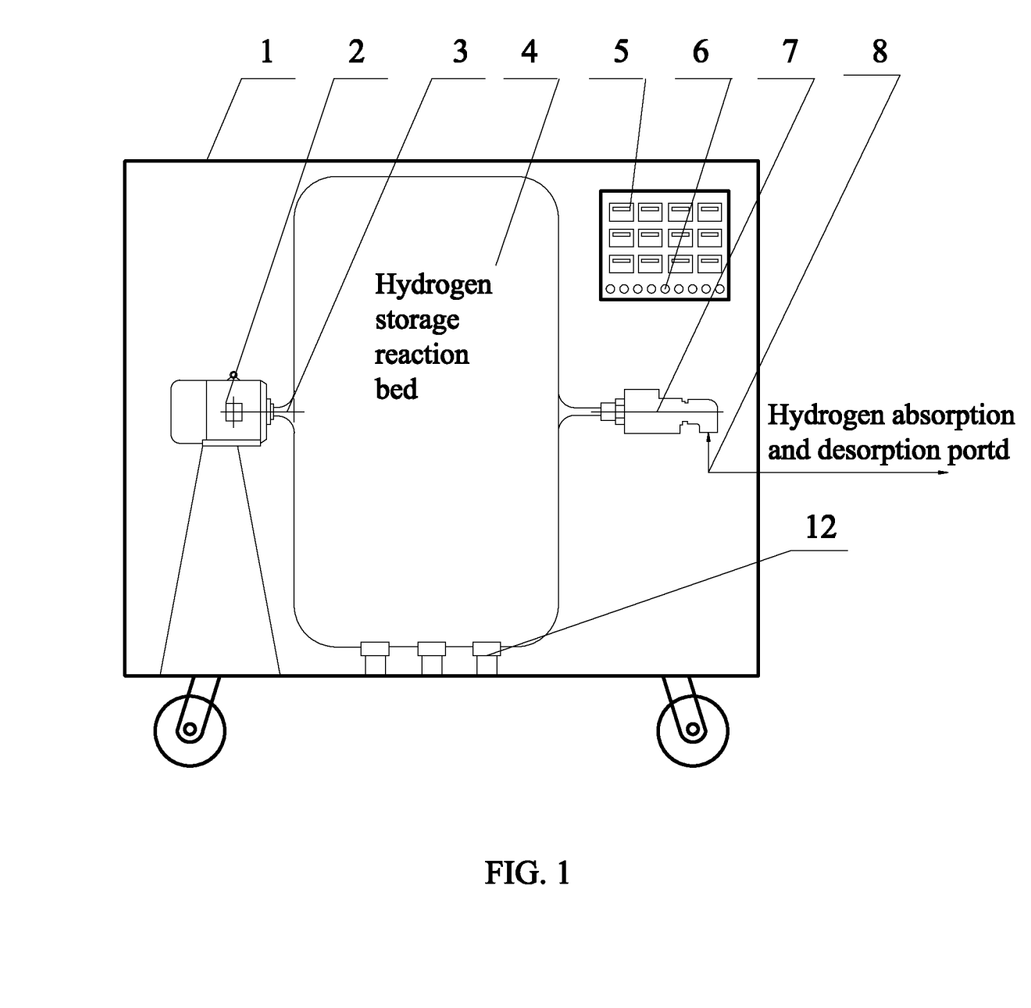
FIG. 1 is a front view of an appearance of an ultra-low-speed rotating low-strain high-filling-rate hydrogen storage alloy reaction device.
Figure 2:
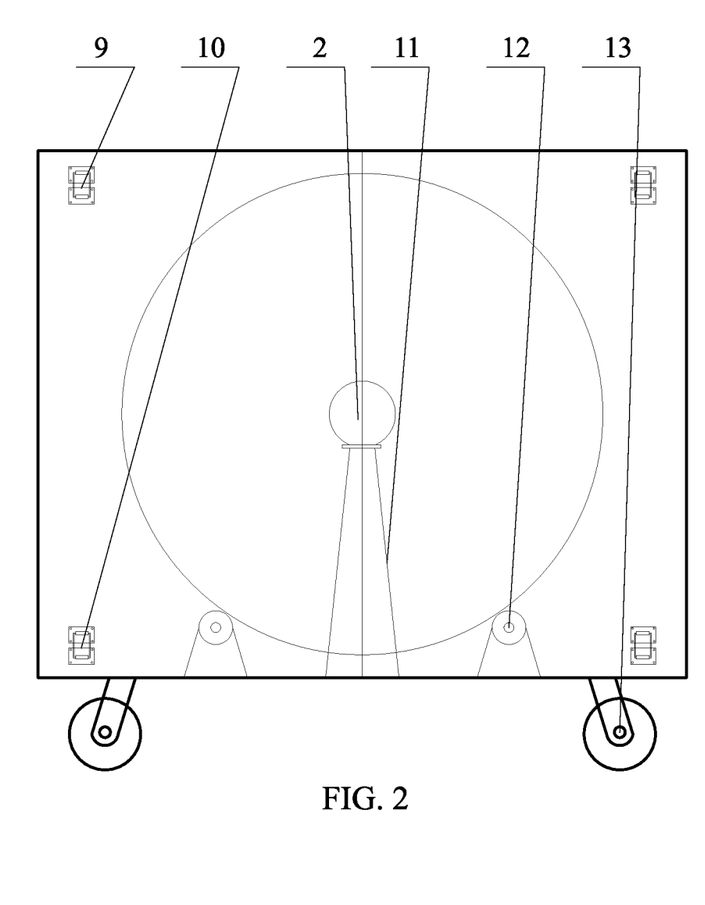
FIG. 2 is a side view of the appearance of the ultra-low-speed rotating low-strain high-filling-rate hydrogen storage alloy reaction device.
Figure 3:
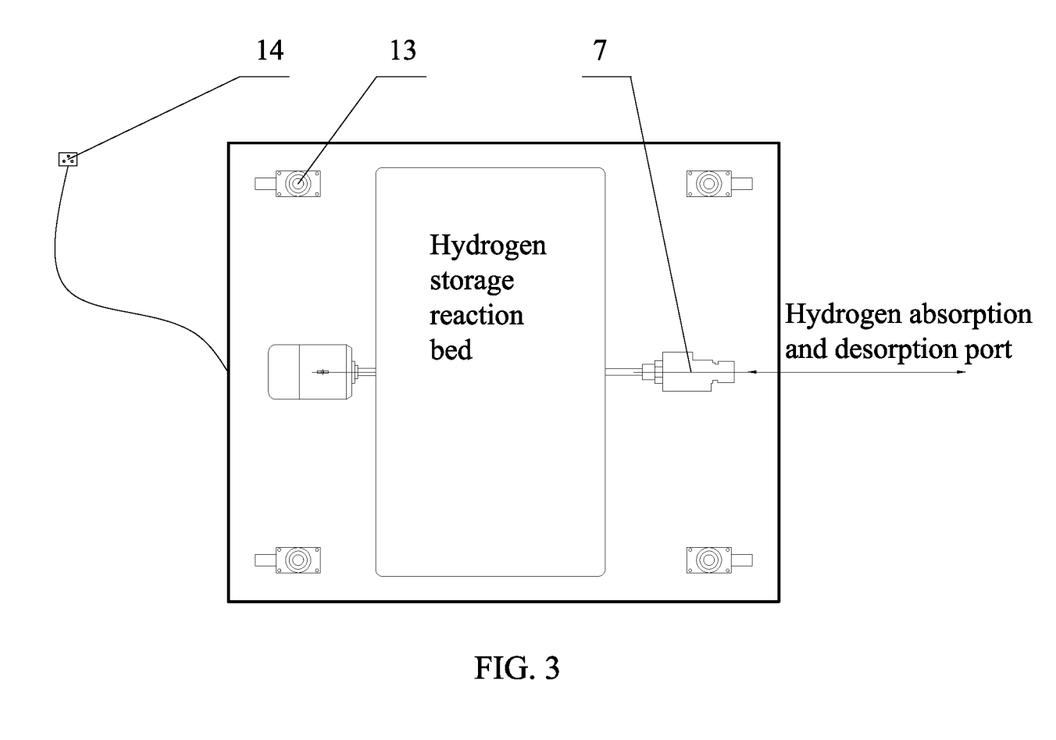
FIG. 3 is a top view of the appearance of the ultra-low-speed rotating low-strain high-filling-rate hydrogen storage alloy reaction device.
Figure 4:
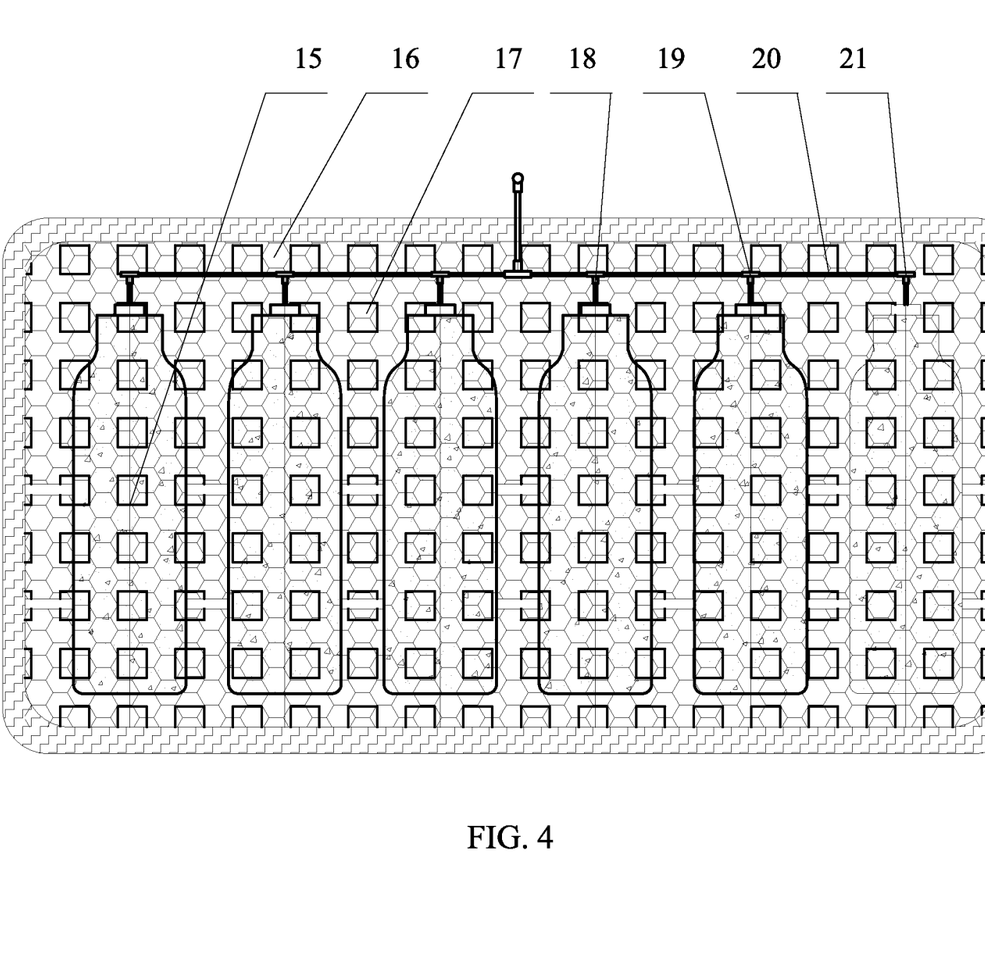
FIG. 4 is a front sectional view of a reaction bed structure with an internally installed hydrogen storage tank.
Figure 5:
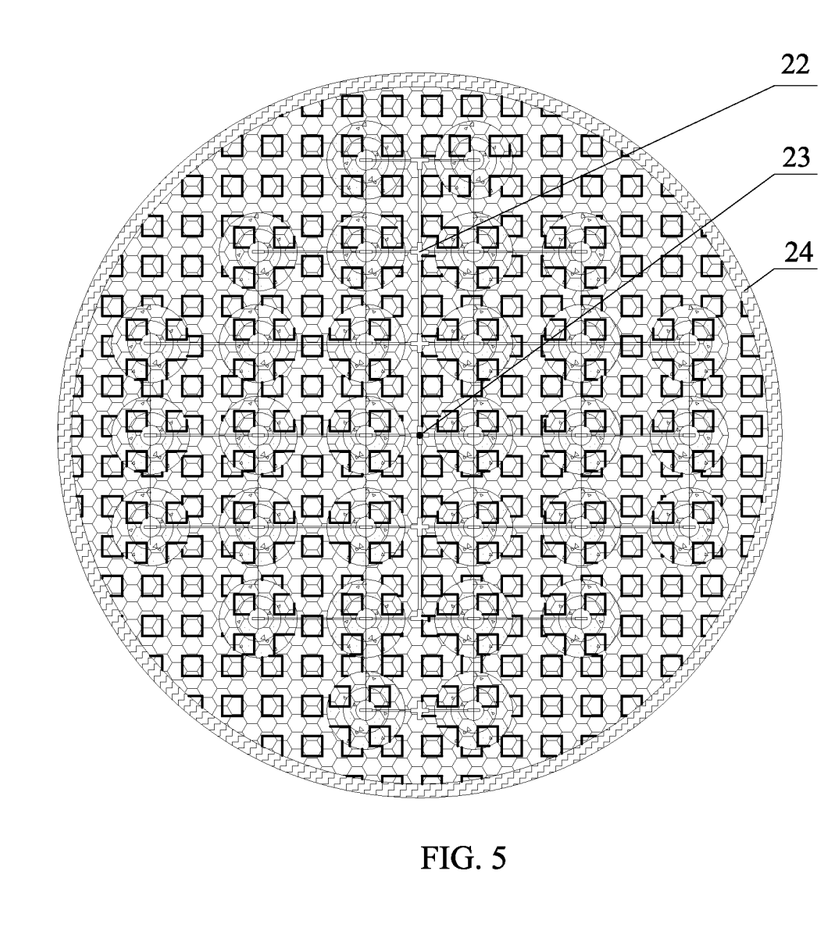
FIG. 5 is a top sectional view of the reaction bed structure with the internally installed hydrogen storage tank.
Figure 6:
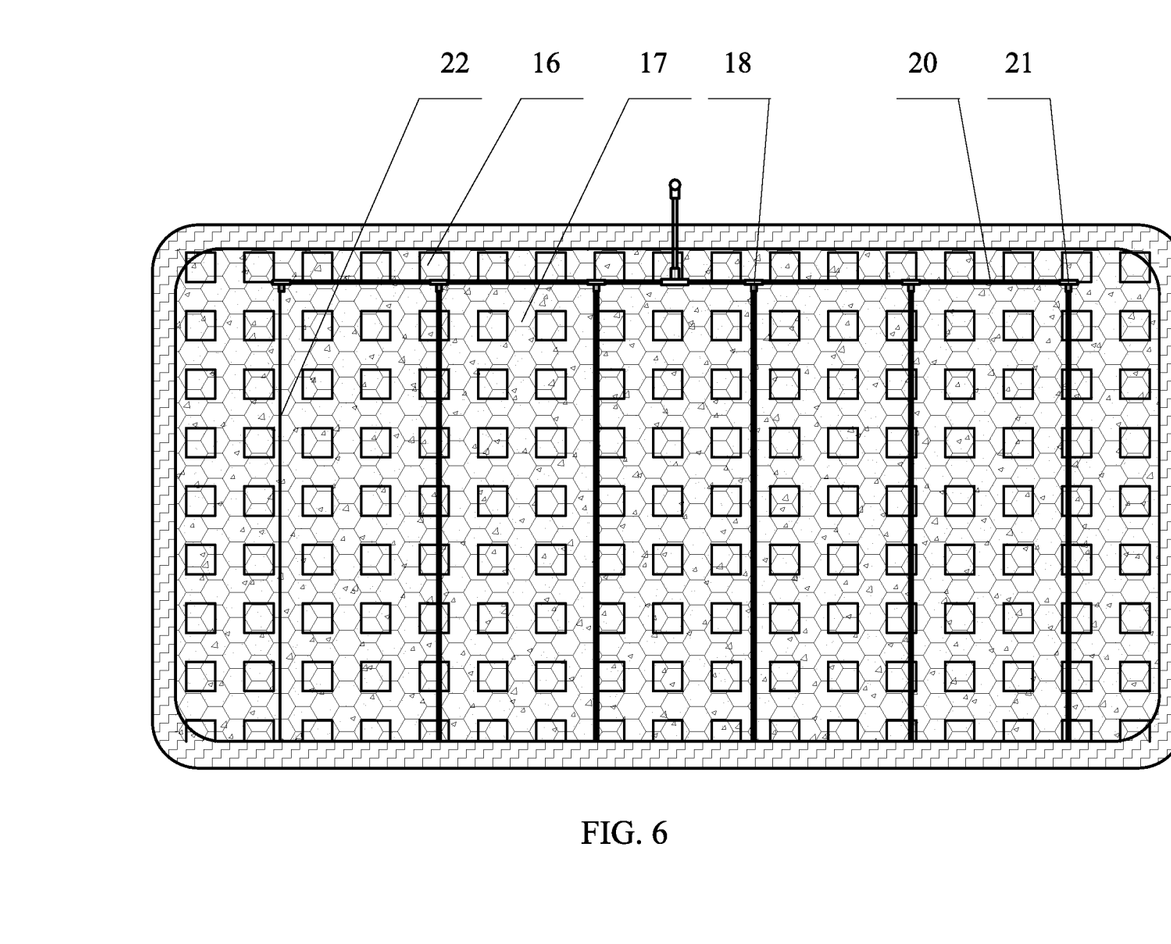
FIG. 6 is a front sectional view of an integrally filled reaction bed.
Figure 7:
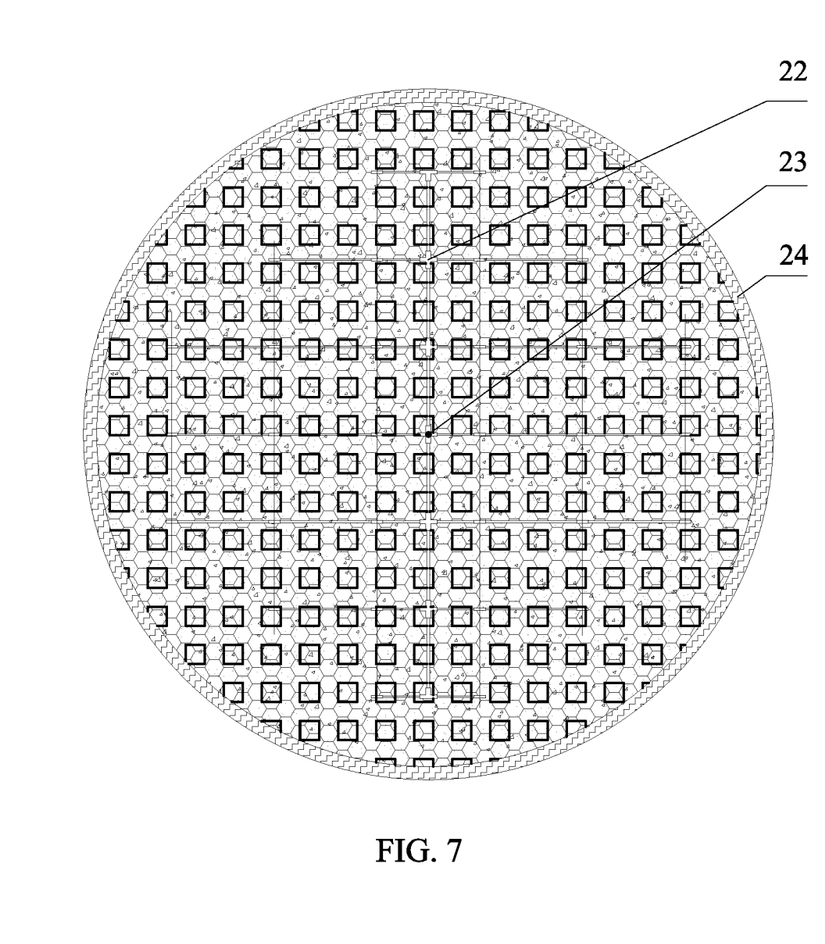
FIG. 7 is a top sectional view of the integrally filled reaction bed.

An ultra-low-speed rotating low-strain high-filling-rate hydrogen storage alloy reaction device includes a thermal insulation pressure-resistant shell 1, an ultra-low-speed motor 2, a hydrogen storage reaction bed 4, and a PLC control display unit 5. The ultra-low-speed motor 2 is coupled with the hydrogen storage reaction bed 4 by a coupler 3, the PLC control display unit 5 is provided with a spot start-stop button 6, and the hydrogen storage reaction bed 4 is connected with a hydrogen absorption and desorption pipeline 8 through a rotating joint 7 with a gas sealing structure. The thermal insulation pressure-resistant shell 1 has a quick-opening locking structure, and a plurality of upper self-locking quick-opening buckles 9 and lower self-locking quick-opening buckles 10 are respectively distributed on a facade, a side surface, and a cover plate. The ultra-low-speed motor 2 is fixed on a bottom plate of the thermal insulation pressure-resistant shell 1 through a motor fixing bracket 11. The hydrogen storage reaction bed 4 rotates at a low speed of 0.3 r/min to 3.0 r/min under driving of the ultra-low-speed motor 2, and an end surface of the circular hydrogen storage reaction bed 4 is supported by the plastic supporting roller 12 to rotate, so as to keep a stability and a good stress state of a bed body. The ultra-low-speed rotating low-strain high-filling-rate hydrogen storage alloy reaction device may be moved or fixed at will under an action of a universal wheel 13, energy of the ultra-low-speed motor 2 and an electric heating shell 24 of the hydrogen storage reaction bed comes from electric energy, and the ultra-low-speed motor and the electric heating shell of the hydrogen storage reaction bed are connected with a power supply device through a power supply connector 14. Examples of specific working processes are as follows.

The ultra-low-speed rotating low-strain high-filling-rate hydrogen storage alloy reaction device of the disclosure has a core characteristic that the hydrogen storage reaction bed 4 rotates at a low speed of 0.3 r/min to 3.0 r/min during hydrogen absorption and desorption, and an original particle 26 of a hydrogen storage alloy, a heat-conducting agent 16, and a coating phase change material 17 in the hydrogen storage reaction bed are all in a rotating state, so that a filling density of the hydrogen storage alloy in the reaction bed 4 is more uniform, and a hardening symptom of a pulverized alloy is obviously improved, thus greatly relieving plastic deformation and failure caused by an excessive local stress of a bed body, prolonging a service life of the reaction bed, and increasing a filling rate of the alloy and a hydrogen storage density of a system. A realization process is described as follows: the hydrogen storage reaction bed 4 is cylindrical, a height-diameter ratio is about 0.2 to 0.5, and a storage capacity is designed according to an amount of hydrogen required in different occasions. An interior of the hydrogen storage reaction bed 4 may be composed of a plurality of standard unit hydrogen tanks 15, and the standard unit hydrogen tanks 15 include the original particle 26 of the hydrogen storage alloy, the heat-conducting agent 16, and the coating phase change material 17. A shell of the hydrogen storage reaction bed 4 is the electric heating shell 24, and the heat-conducting agent 16 and the coating phase change material 17 are filled between the standard unit hydrogen tanks 15 and the electric heating shell 24. The plurality of standard unit hydrogen tanks 15 and hydrogen tank filter sealing gaskets 18 thereof, a plurality of three-way pipe joints 19, a plurality of connecting branch pipes 20, and a plurality of two-way joints 21 are connected to each other to form a main hydrogen pipe 23, and hydrogen may be absorbed and released in the channel. The interior of the hydrogen storage reaction bed 4 may also be composed of the original particle 26 of the hydrogen storage alloy, the heat-conducting agent 16, the coating phase change material 17, and the shell of the hydrogen storage reaction bed 4 directly. A plurality of gas-guide tubes 22 are inserted in the original particles 26 of the hydrogen storage alloy, which are connected with the plurality of three-way pipe joints 19, the plurality of connecting branch pipes 20, and the plurality of two-way joints 21 to form the main hydrogen pipe 23, and the hydrogen may also be absorbed and released in the channel.

Figure 8:
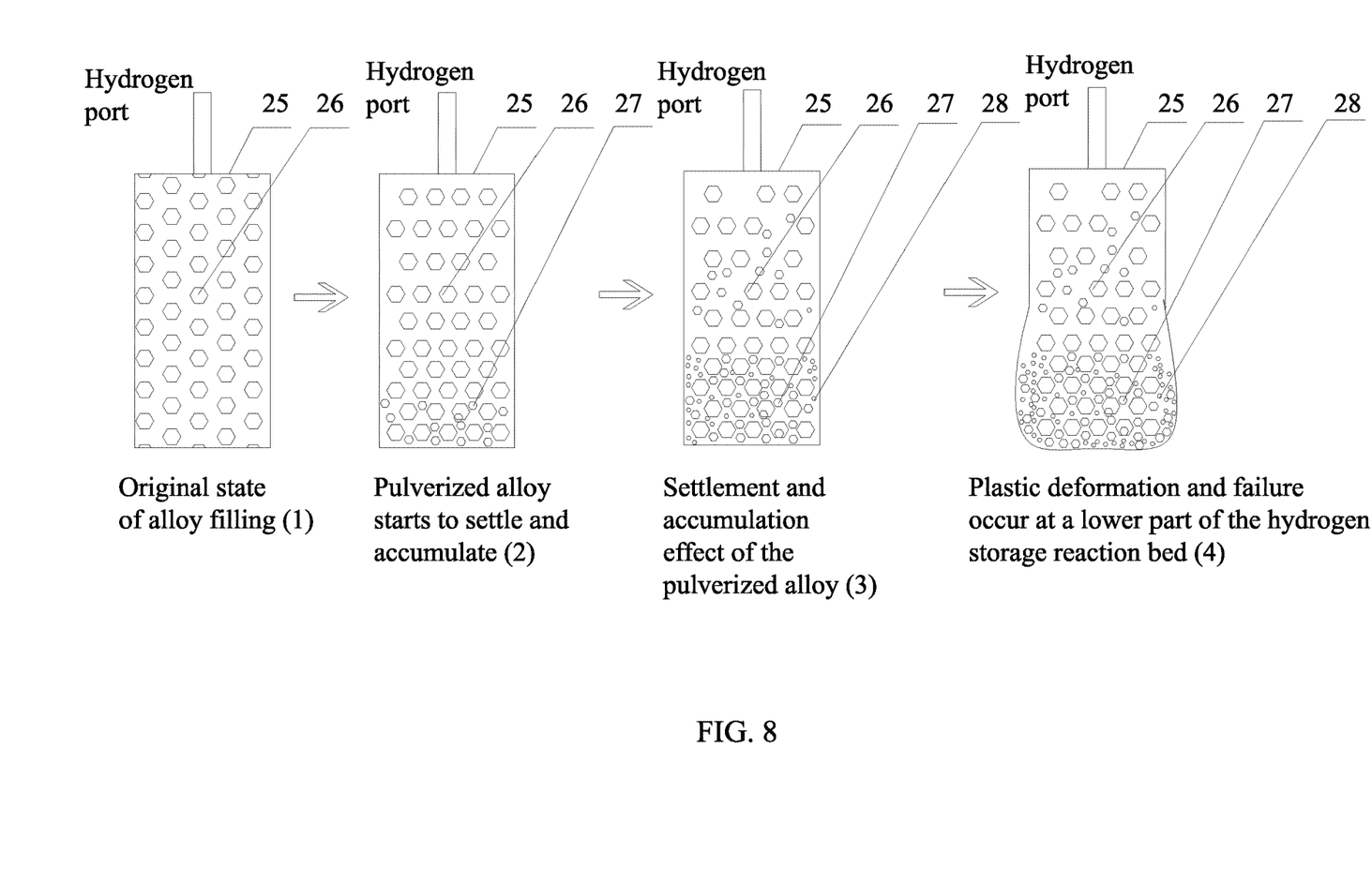
FIG. 8 is a schematic diagram showing an expansion and contraction movement of a hydrogen storage metal in a longitudinally placed static reaction bed.
Figure 9:
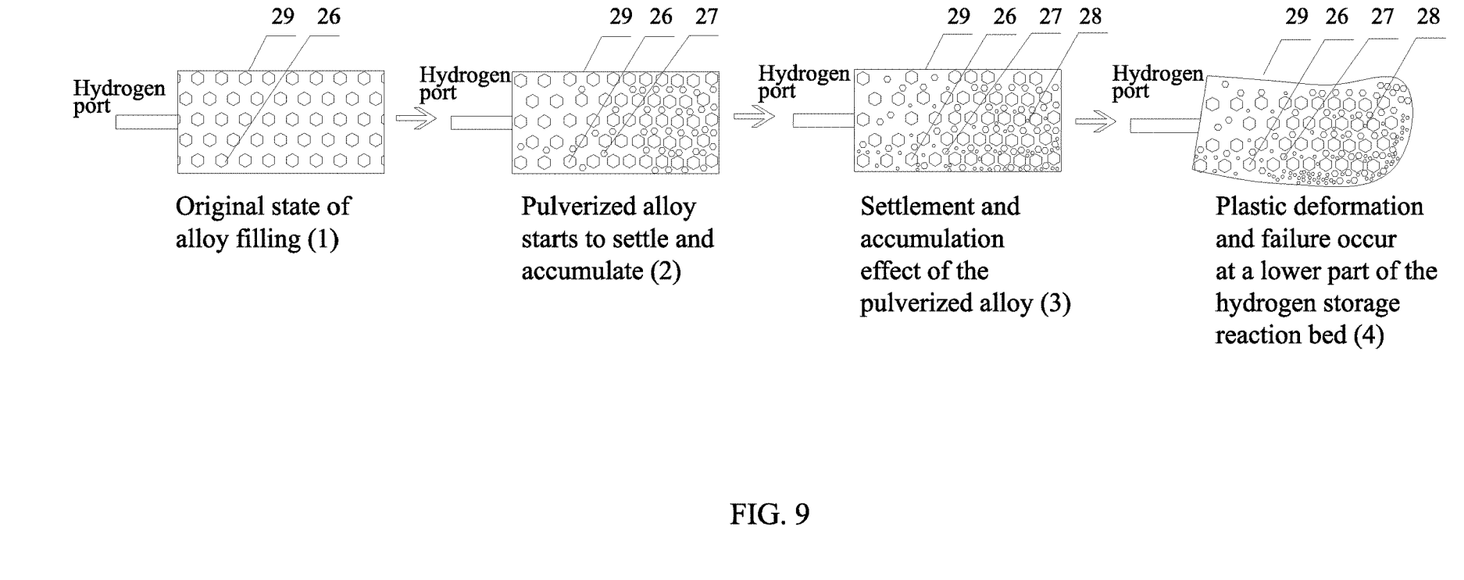
FIG. 9 is a schematic diagram showing an expansion and contraction movement of a hydrogen storage metal in a transversally placed static reaction bed.
Figure 10:
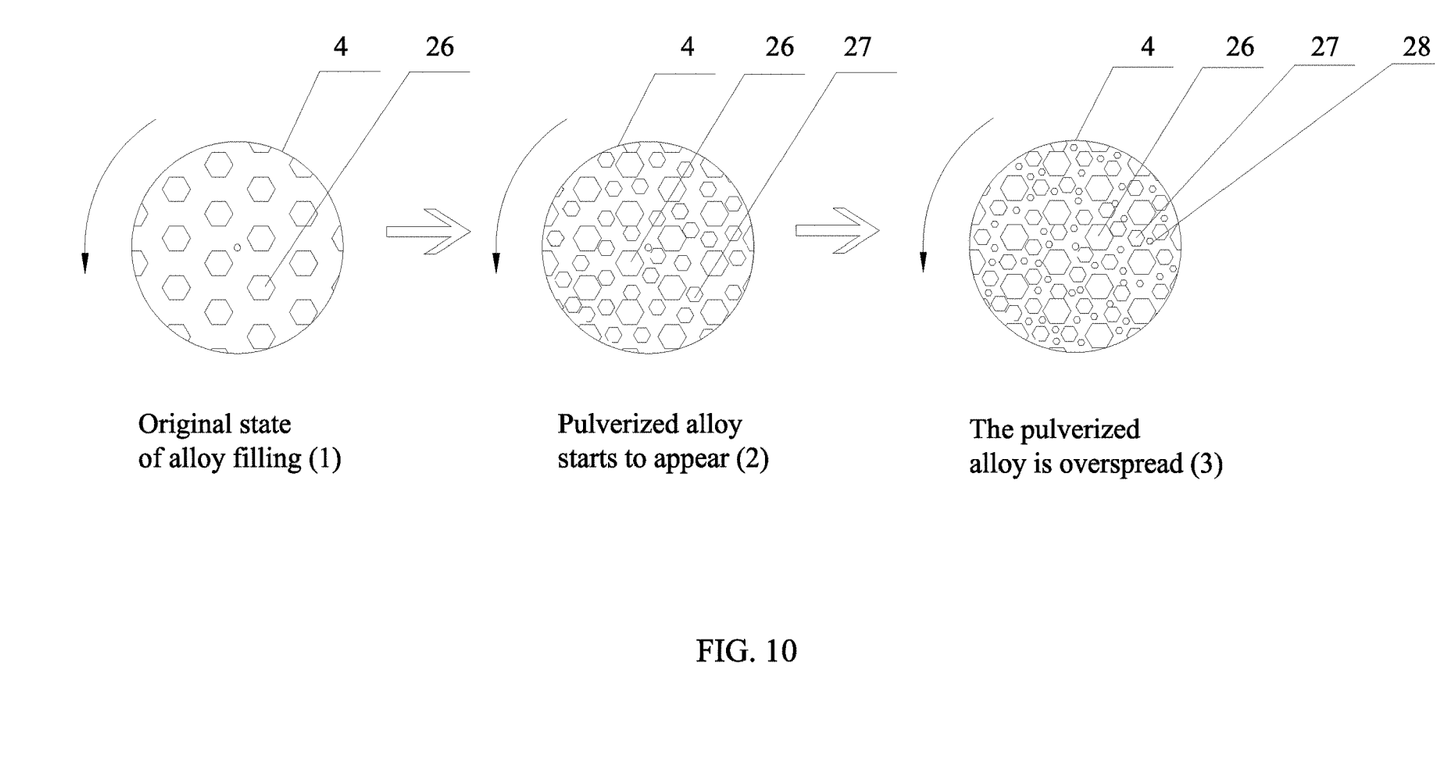
FIG. 10 is a schematic diagram showing an expansion and contraction movement of a hydrogen storage metal in a rotating reaction bed.

For a longitudinally placed static hydrogen storage reaction bed 25, initial distribution of the original particles 26 of the hydrogen storage alloy is shown in FIG. 8(1), and a volume has a periodic expansion and contraction characteristic during hydrogen absorption and desorption circulation, with a highest expansion rate reaching 15% to 20%. When the hydrogen absorption and desorption circulation of the alloy is repeated for many times, the alloy is crushed and pulverized, and some original particles 26 of the alloy are crashed into fine particles 27 of the pulverized alloy and fine particles 28 of the pulverized alloy (as shown FIG. 8(2)). The pulverized fine particles 27 and fine particles 28 are naturally settled from an upper part under a combined action of a gravity and a circulating compression effect, resulting in continuous increase of a local density of a lower part of the longitudinally placed static hydrogen storage reaction bed 25 or the longitudinally placed standard unit hydrogen tank 15 (as shown in FIG. 8(3)). In the case of hydrogen absorption expansion again, a compressive stress and a cohesion borne by powder are increased sharply, and the alloy is easy to be hardened and subjected to stress accumulation, resulting in plastic deformation and failure firstly occurring at a lower part of the longitudinally placed static hydrogen storage reaction bed 25 or the longitudinally placed standard unit hydrogen tank 15 (with reference to FIG. 8(4)). For a transversely placed static hydrogen storage reaction bed 29, initial distribution of the original particles 26 of the hydrogen storage alloy is shown in FIG. 9(1). After the hydrogen absorption and desorption circulation is repeated for many times, the alloy is crushed and pulverized, and some original particles 26 of the alloy are crashed into fine particles 27 of the pulverized alloy and fine particles 28 of the pulverized alloy (as shown in FIG. 9(2)). The pulverized fine particles 27 and fine particles 28 are naturally settled from an upper part under a combined action of a gravity and a circulating compression effect, resulting in continuous increase of a local density of a lower part of the transversely placed static hydrogen storage reaction bed 29 or the transversely placed standard unit hydrogen tank 15 (as shown in FIG. 9(3)). In the case of hydrogen absorption expansion again, a compressive stress and a cohesion borne by powder are increased sharply, resulting in plastic deformation and failure firstly occurring at a lower part of the transversely placed static hydrogen storage reaction bed 29 or the transversely placed standard unit hydrogen tank 15 (with reference to FIG. 9(4). The hydrogen storage reaction bed 4 of the disclosure rotates at an ultra-low-speed of 0.3 r/min to 3.0 r/min during hydrogen absorption and desorption, and the original particle 26 of the hydrogen storage alloy in the hydrogen storage reaction bed or the hydrogen stored in the standard unit hydrogen tank 15 rotates at a slow speed. Initial distribution of the original particles 26 of the hydrogen storage alloy is shown in FIG. 10(1), and although alloy pulverization is inevitable (with reference to FIG. 10(2)), the ultra-low-speed characteristic of the reaction bed makes the alloy generate a small-scale non-directional movement effect under an action of micro-gravity. A gravity effect is introduced by a periodic rotating movement, and a contact wall surface and the alloy have a periodic circulation of "close contact" (a bed body is located below the alloy) and "separation" (the bed body is located above the alloy), so that a risk of one-way settlement and accumulation of the pulverized alloy is effectively prevented, the pulverized alloy is finally distributed in the reaction bed (with reference to FIG. 10(3)), a deviation of a local filling density of the alloy is obviously reduced, a natural settlement effect of the alloy under a gravity is obviously improved, the circulating compression effect of the alloy is obviously weakened, a filling density of metal particles in the reaction bed is more uniform, and hardening of the pulverized alloy is significantly reduced, thus greatly relieving plastic deformation and failure caused by an excessive local stress of the bed body, prolonging a service life of the reaction bed, and increasing the filling rate of the alloy and the hydrogen storage density of the system.

Although the specific embodiments of the disclosure are described with reference to the accompanying drawings above, the scope of protection of the disclosure is not limited by this. Those skilled in the art shall understand that various modifications or variations that can be made by those skilled in the art without going through creative works are still within the scope of protection of the disclosure.

What is claimed is:

1. An ultra-low-speed rotating low-strain high-filling-rate hydrogen alloy automatic absorption-desorption reaction device, comprising a shell, a hydrogen storage reaction bed, a motor, a PLC controlling and monitoring system, a wire inlet port and a hydrogen absorption and desorption port; wherein the hydrogen storage reaction bed is in a cylindrical shape, and rotates at a low speed of 0.3 r/min to 3.0 r/min under driving of the motor; facades on two sides of the hydrogen storage reaction bed are respectively provided with a transmission shaft and the hydrogen absorption and desorption port; the transmission shaft is connected with the motor, the hydrogen absorption and desorption port is connected with a high-pressure hydrogen storage tank and a hydrogen-consuming device; the hydrogen storage reaction bed contains a hydrogen storage alloy, a heat-conducting anti-hardening filling material, and a phase change material; a shell of the hydrogen storage reaction bed is provided with a heater, and subjected to thermal insulation treatment; and an external side surface of the reaction device is provided with the PLC controlling and monitoring system.

2. The ultra-low-speed rotating low-strain high-filling-rate hydrogen alloy automatic absorption-desorption reaction device according to claim 1, wherein a lower part of the hydrogen storage reaction bed is supported by 1 to 3 sets of supporting wheels.

3. The ultra-low-speed rotating low-strain high-filling-rate hydrogen alloy automatic absorption-desorption reaction device according to claim 1, wherein the hydrogen storage reaction bed is capable of being assembled by a plurality of transversely placed unit hydrogen storage tanks, or is also capable of having a structure integrally filled with the hydrogen storage alloy.

4. The ultra-low-speed rotating low-strain high-filling-rate hydrogen alloy automatic absorption-desorption reaction device according to claim 1, wherein a nickel foam or aluminum foam is used as the heat-conducting anti-hardening filling material; and a $NaNO_3$ particle plated with copper or silver is used as the phase change material.

5. The reaction device according to claim 4, wherein a height-diameter ratio of the hydrogen storage reaction bed is about 0.2 to 0.5, and the hydrogen storage reaction bed rotates at a low speed of 0.3 r/min to 3.0 r/min during hydrogen absorption and desorption; and a ratio of a volume of the hydrogen storage alloy to an effective volume of the hydrogen storage reaction bed is 35% to 50%.

6. The reaction device according to claim 5, wherein a heat flow generated during hydrogen absorption and desorption of the hydrogen storage alloy is absorbed by the $NaNO_3$ particle plated with copper or silver, and an amount of the phase change material is calculated with a theoretical heat flow load of the hydrogen storage alloy; and the heat-conducting anti-hardening filling material has a filling rate ranging from 15% to 40%.

7. The reaction device according to claim 6, wherein a metal hydrogen storage capacity is controlled to be less than 90% of a theoretical value.

8. The reaction device according to claim 1, wherein the shell of the hydrogen storage reaction bed is capable of providing a constant temperature working environment ranging from −20° C. to 400° C.

\* \* \* \* \*